United States Patent
Harper

(10) Patent No.: US 8,958,170 B1
(45) Date of Patent: Feb. 17, 2015

(54) MANAGEMENT OF TAPE DRIVE QUALITY USING DISCRETE FOURIER TRANSFORM ANALYSIS

(71) Applicant: International Business Machines Corporation, Armonk, NY (US)

(72) Inventor: David H. F. Harper, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/182,003

(22) Filed: Feb. 17, 2014

(51) Int. Cl.
*G11B 5/55* (2006.01)

(52) U.S. Cl.
USPC ..................................... 360/78.02; 360/77.12

(58) Field of Classification Search
CPC ............. G11B 21/083; G11B 5/59627; G11B 5/5534; G11B 5/00878; G11B 5/00821
USPC ............. 360/77.04, 77.08, 55, 75, 51, 31, 60, 360/77.02, 77.12, 134, 77.15, 70, 77.14, 360/73.04, 53, 63, 291, 251
See application file for complete search history.

(56) References Cited

U.S. PATENT DOCUMENTS

| 5,511,422 | A | 4/1996 | Hernandez |
|---|---|---|---|
| 6,678,108 | B2 | 1/2004 | Smith et al. |
| 7,268,970 | B2 | 9/2007 | Anderson et al. |
| 7,881,004 | B2 | 2/2011 | Kumbla et al. |
| 7,894,156 | B2 * | 2/2011 | Ehrlich et al. ............. 360/77.04 |
| 2012/0281309 | A1 | 11/2012 | Fasen et al. |
| 2013/0128376 | A1 | 5/2013 | Chan |

OTHER PUBLICATIONS

Lantz, M., and Jelitto, J., , "Tape Servo System", IBM Research, Storage Technologies. http://www.research.ibm.com/labs/zurich/sto/tape/servo/.

\* cited by examiner

*Primary Examiner* — Ali Neyzari
(74) *Attorney, Agent, or Firm* — Jonathan V. Sry; Jennifer M. Anda

(57) ABSTRACT

Embodiments of the present disclosure relates to a method, system, and computer program product for determining an error contribution from a roller bearing in a tape drive. The method includes receiving, from a tape drive, a Position Error Signal (PES) data set. The method also includes determining a number of Discrete Fourier Transform (DFT) iterations based upon a frequency of interest and the number of samples. The method also includes performing, based upon the determined number of DFT iterations, a plurality of DFT iterations on the PES data set including the frequency of interest. Each DFT iteration is performed on a different number of samples from the PES data set. The method also includes identifying a plurality of amplitudes from the plurality of DFT iterations that corresponds to disturbance contributions from one of the rollers in the tape drive.

20 Claims, 7 Drawing Sheets

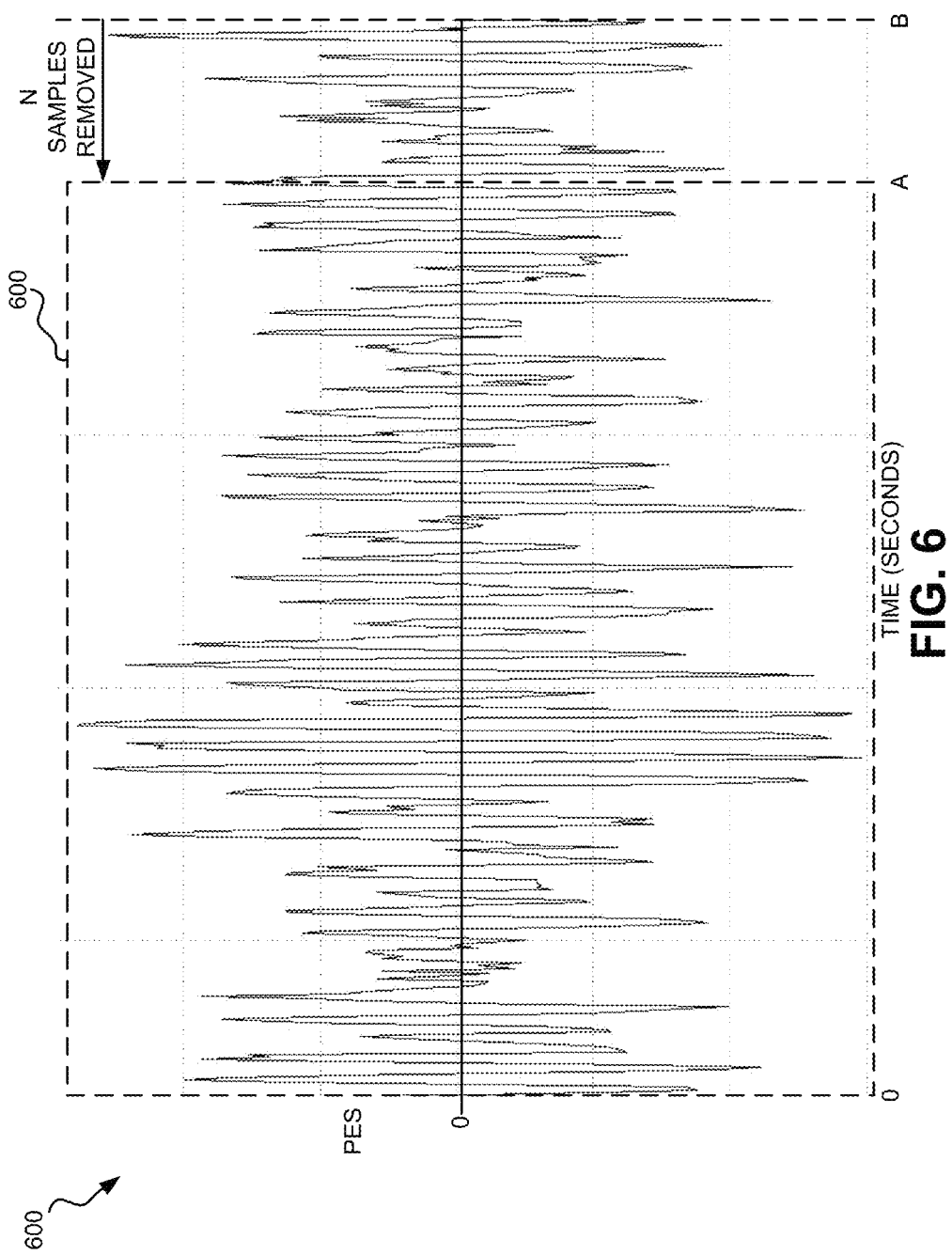

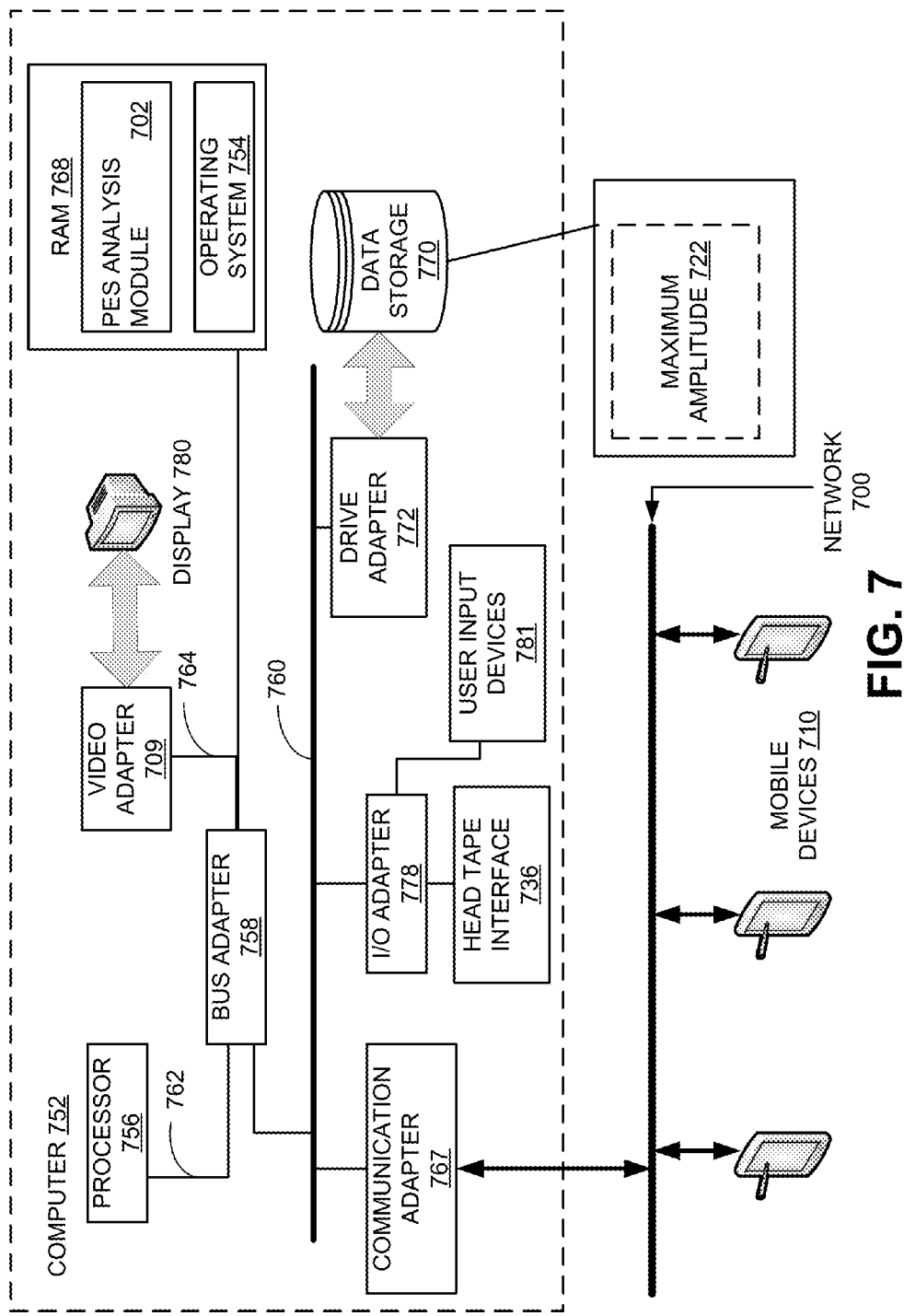

MANAGEMENT OF TAPE DRIVE QUALITY USING DISCRETE FOURIER TRANSFORM ANALYSIS

BACKGROUND

The present disclosure relates to tape drives, and more specifically, to roller bearing variance.

Typically, in a tape drive, there are multiple roller bearings, or rollers, of the same general size, but are not rotating in perfect synchronous motion with each other. The roller bearings are also slightly different in diameter, usually at a microscopic scale which may cause positional variance of the tape with respect to the read/write head of the tape drive.

The runout characteristic of each roller bearing is unique. The runout describes how each roller bearing contributes to the Position Error Signal (PES) during typical track following operations. The runout is the tendency of the roller bearing to deviate from a nominal rolling motion, e.g., a wobble. The runout of a roller bearing may cause the tape to vibrate off-track.

SUMMARY

Embodiments of the present disclosure relate to a method, system, and computer program product for determining an error contribution from a roller bearing in a tape drive.

One embodiment is directed toward a method. The method includes receiving, from a tape drive, a Position Error Signal (PES) data set. The PES data set describes a positional variance of a head tape interface in relation to a tape and that has a number of samples. The method also includes determining a frequency of interest based on a size of one or more rollers in the tape drive and a velocity of the tape. The method also includes determining a number of Discrete Fourier Transform (DFT) iterations based upon the frequency of interest and the number of samples. The method also includes performing, based upon the determined number of DFT iterations, a plurality of DFT iterations on the PES data set including the frequency of interest. Each DFT iteration is performed on a different number of samples from the PES data set. The method also includes identifying a plurality of amplitudes from the plurality of DFT iterations that corresponds to disturbance from one or more of the rollers in the tape drive.

Another embodiment is directed toward a system. The system includes a tape drive that is configured to read a position error signal (PES) from a storage tape. The PES describes a positional variance of a head tape interface in relation to the storage tape. The system also includes a position error signal (PES) analysis module that is configured to receive, from the tape drive, a PES data set that has a number of samples. The PES analysis module is configured to determine a frequency of interest based on a size of one or more rollers in the tape drive and a velocity of the storage tape. The PES analysis module is configured to determine a number of Discrete Fourier Transform (DFT) iterations based upon the frequency of interest and the number of samples. The PES analysis module is configured to perform, based upon the determined number of DFT iterations, a plurality of DFT iterations on the PES data including the frequency of interest. Each DFT iteration from the plurality of DFT iterations is performed on a different number of samples from the PES data set. The PES analysis module is configured to identify a plurality of amplitudes from the plurality of DFT iterations that corresponds to noise from one or more rollers in the tape drive.

Another embodiment is directed toward a computer program product.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 6 illustrates a sample Position Error Signal graph, according to various embodiments.

FIG. 7 illustrates a block diagram of automated computing machinery, according to various embodiments.

Figure 1:
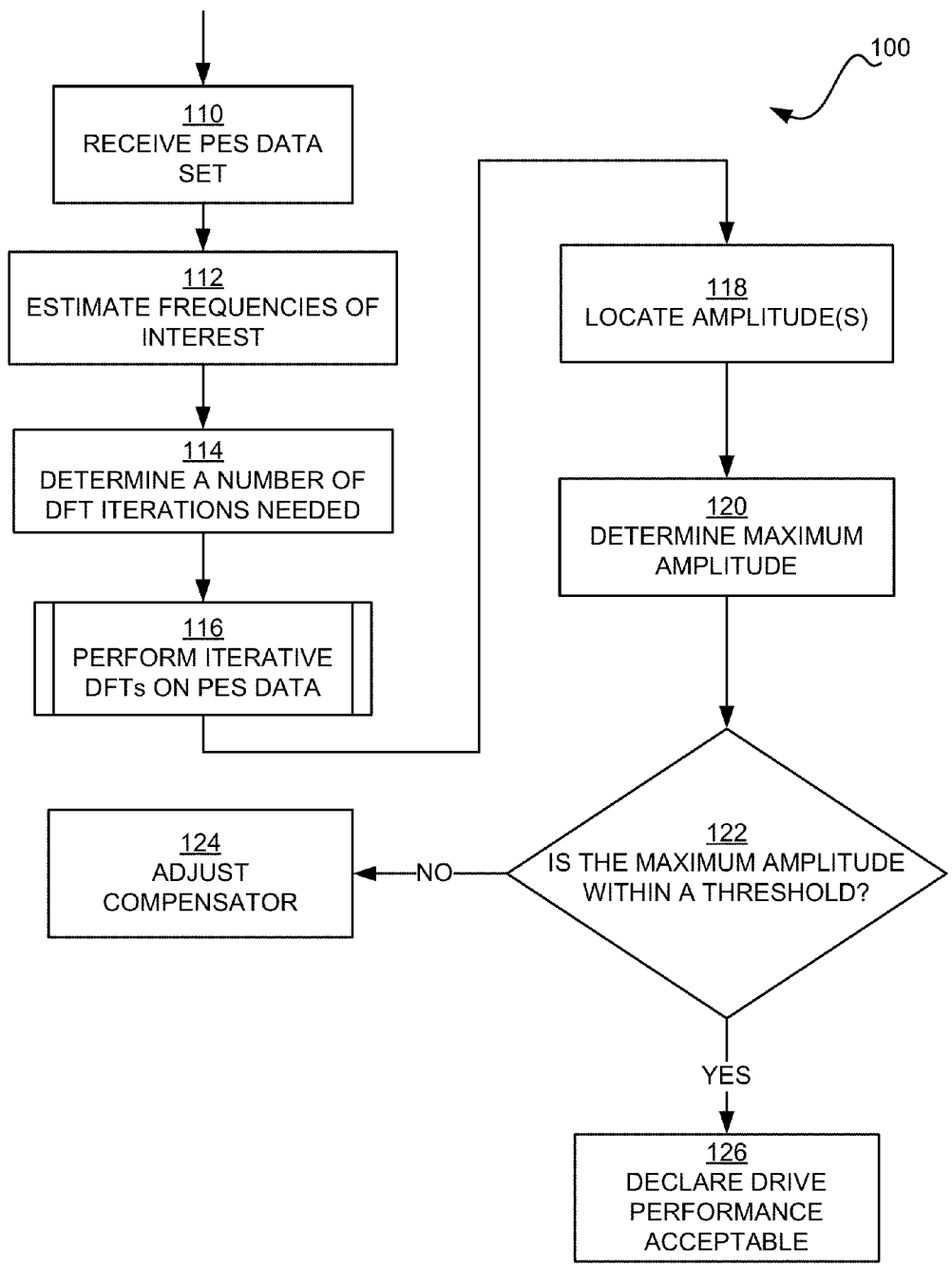
FIG. 1 illustrates a flowchart of a method for testing a tape drive, according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to tape drives, more particular aspects relate to roller bearing variance. For instance, aspects of the present disclosure relate to characterizing roller bearing contributions in a tape drive by applying an iterative Discrete Fourier Transform (DFT) process to a Position Error Signal (PES) data set. The iterative DFT process works by removing, adding or otherwise changing, the number of samples in the PES data set after every iteration and result in a plurality of amplitudes. The amplitudes of the plurality of amplitudes are then be compared against an amplitude threshold to screen out non-conforming tape drives. While the present disclosure is not necessarily limited to such applications, various aspects of the disclosure may be appreciated through a discussion of various examples using this context.

In tape drive systems, a tape position may vary with respect to fixed components such as rollers as the tape travels through the tape drive. As long as the lateral tape position may be predicted, the head tape interface/head may track the tape. However, due to various aspects such as velocity variation and roller size variance, then the position of the head may not completely be synchronous with the tape. In this event, a PES may typically be derived from the head and tape difference. Aspects on the present disclosure may relate to determining the contribution of rollers to the PES which may be used for updating the tracking algorithm and quality control of the tape drive during manufacture.

In traditional tape drive systems, when performing a DFT on the collected data sets, such as a PES data set, the resulting amplitude of a harmonic peak of interest is uncertain and variable due to leakage concerns. The harmonic peak of interest may be the result of a DFT applied to a PES data set at a range of frequencies that include a frequency of interest. Leakage results in harmonic peak amplitude uncertainties when performing the DFT due to the DFT processing of the data where the periodic data does not end on an integral period. In other words, the leakage results from partial waves that are not interpreted by the DFT. With a multiple roller bearing tape path system, the roller bearings may end at non-integral rotations at the end of a data collection process. The non-integral rotations may be random and the result of the position of each roller bearing, as well as variations in the tape velocity, combined with the timing of the data collection process.

The PES in a tape drive shows how far off-track heads are in a specific moment of time. The PES may describe a positional variance between a position head tape interface and the tape. For example, a tape being read by a head may have the frequency and position vary with regard to the tape.

In order to characterize the contributions of the roller bearing disturbances in the PES signal, it may be beneficial to optimize the amplitude of the harmonic peaks as these harmonic peak amplitudes which may useful in describing the amount of contribution of the roller bearings to the PES. The PES contributions from the rollers may be used to reduce a track following error in tape servo systems where the read/write head may be adjusted over the desired track. Furthermore, the values of the amplitude may be used to determine an amplitude of interest. The amplitude may be compared to an amplitude threshold to determine if the disturbance contributions to the PES are acceptable or not. If the amplitude of interest is beyond the amplitude threshold, then a tape drive tester may respond by rejecting the tape drive as non-conforming. For instance, the amplitude of interest could be selected by identifying a DFT amplitude with a high (or maximum) peak value relative to other DFT amplitudes. In addition, the amplitude of interest could also be used to screen during the drive manufacturing process or help fine tune the track following compensator if the amplitude is determined to be outside of a threshold or a nominal range. The compensator may be adjusted based on the results of the findings to further reduce the PES.

Aspects of the present disclosure describe how to optimize the amplitude from the harmonic peak so that an accurate characterization of the amplitude is made. The amplitude of the harmonic peaks may vary because of the asynchronous nature of the tape traveling on the roller bearings. Slippage may occur between the tape and the one or more roller bearings within the tape drive and may cause the roller bearings to be out of synchronicity with each other. This slippage may affect the amplitude for the harmonic peak.

FIG. 1 illustrates a flowchart of a method 100 for testing a tape drive, according to various embodiments. The testing may use an iterative discrete Fourier transform (DFT) process on varying samples of a position error signal (PES) data set, according to various embodiments. As mentioned herein, the method 100 may involve finding an amplitude of interest for a PES data set. The method 100 may begin at operation 110.

In operation 110, a tape drive tester (also referred to as a tester herein) may receive the PES data set that describes a positional variance of a head in relation to a tape. The PES data set may also include a number of samples, e.g., 100,000 samples. According to various embodiments, the PES data set of the tape drive may be collected in a single run or multiple runs. If the PES data set is acquired in multiple runs, a running average of the DFT's may be utilized. For example, if the DFT for the frequency 100 Hz is measured as 3 nm and then the PES is rerun producing a DFT value of 4 nm on the second run, then the 3 nm and 4 nm measurements may be rerun. After the PES data set is acquired, then the method 100 may continue to operation 112.

In operation 112, the tester may estimate the frequencies of interest for the rollers. The frequencies of interest may be a based on a diameter/size of one or more rollers in the tape drive and a tape speed/velocity of the tape. The precise diameter may not be required. According to various embodiments, the rollers may be roughly identical to each other and have the same frequency of interest. The following formula may be used to determine the frequency of interest:

$$Freq.ofInterest(\text{cycles/sec}) = \frac{tapeVelocity(\text{meters/sec})}{2\pi \times bearingRadius(\text{meters/cycle})}$$

For example, a tape drive with a tape velocity of 4 [meters/second] and a bearing radius of $6\times10^{-3}$ [meters/cycle] would have a frequency of interest of 106.1 [cycles per second] or [Hz].

According to various embodiments, the frequency of interest may apply to any harmonic for the frequency of interest. For the sake of simplicity, the first harmonic of the roller bearing may be the object of focus. The first harmonic may also be described as the 'once around' frequency of a roller bearing in a tape path that operates at a relatively constant speed.

The frequencies of interest may also be determined for roller bearings of different sizes. For example, if there are four rollers, with three rollers operating at a frequency of 110 Hz, and one roller operating at a frequency of 100 Hz, then the 100 Hz roller would give different harmonics, e.g., 100 Hz, and a 200 Hz, in addition to the 110 Hz and the 220 Hz harmonics of the other rollers. The amplitude associated with the 100 Hz bearing may be determined separately.

According to various embodiments, the rollers with the frequency of interest may include a tolerance to include similar sized rollers into the frequency of interest. For example, if there are four rollers, with three rollers operating at a frequency of 110 Hz and one roller operating at a frequency of 109 Hz, and the tolerance is plus or minus five Hz, then the roller at 109 Hz may be included in the frequency of interest determination. After the frequencies of interest are estimated, then the method 100 may continue to operation 114.

In operation 114, the tester may determine the number of DFT iterations that are needed for the PES sample data set. Since each DFT iteration is capturing a specific position of the tape, the number of DFT iterations may be a number of samples that are produced within one rotation of the roller bearing including the frequency of interest. The total number of samples, i.e., the initial window size, in the PES data set may be used for this determination. This will determine the number of DFTs, i.e., the DFT iterations, to apply over the PES data set. The number of DFT iterations may be determined by applying the sampling period that the data was collected at (i.e., the Sample Period) and knowing the roller rotational frequency of interest, i.e., the frequency of interest. The number of DFT iterations to apply may be defined as follows:

$$TotalDFT Iterations = \frac{1}{Freq. of Interest \times Sample Period}$$

For example if the bearing is rotating at 100 Hz, i.e., the frequency of interest is 100 Hz, and the sampling rate is 100 microseconds, it will be necessary to perform 100 DFTs on the data to find the optimum peak amplitude of the first harmonic.

For higher frequency harmonics, e.g., a second harmonic at 200 Hz, a third harmonic at 300 Hz, etc., it would only be necessary to process over a proportional fraction of a single rotation. For example, for a second harmonic, the number of DFT iterations would be over ½ a single rotation of a bearing in order to find the optimum harmonic peak amplitude. The number of DFT iterations calculated may be determined to the nearest upper integer. Once the number of DFT iterations is determined, then the method 100 may continue to operation 116.

In operation 116, the tester may perform iterative DFTs on the PES data set. During the iterative DFTs, the tester may perform the DFT on the PES data set with a first window corresponding to samples from the total available samples. The PES data set may be modified by changing the window size to add or remove samples. For instance, the initial window may include all samples of the PES data set. After a DFT is run on the initial window, the window may be shrunk by removing a sample and perform another DFT. The iterative DFT may be performed until the number of data sets removed is equal to the number of DFT iterations determined in operation 114. Various aspects of the iterative DFT process are described further herein. Once the iterative DFTs are performed on PES data, then the method 100 may continue to operation 118.

In operation 118, the tester may monitor for one or more amplitudes resulting from the DFT iterations. In various embodiments, each DFT iteration may produce an amplitude for the runout caused by a roller. The runout may be measured in microns, for example. The runout measurement may vary depending on where the tape is relative to the roller and the positional variance from the head tape interface to the tape. After the amplitudes are located, in operation 118, then the method 100 may continue to operation 120.

In operation 120, the tester may evaluate the amplitudes from operation 118 and determine the amplitude of interest. The amplitude of interest may be determined by monitoring for the peak amplitude of the frequency of interest with iterations of samples removed and the corresponding harmonic for each run. The amplitude of interest may be determined based on plotting the amplitudes as a function of the samples removed from each DFT iteration. In some embodiments, the amplitude may be the largest amplitude value. The amplitude of interest may be selected based upon other factors, such as by excluding amplitudes that are not within a particular standard deviation of an average for the plurality of amplitudes. After the amplitude of interest is determined, then the method 100 may continue to operation 122.

In operation 122, the tester may compare the amplitude of interest from operation 120 to an amplitude threshold. For example, if the amplitude threshold is determined to be 10 microns but the amplitude of interest is 3 microns, then the amplitude of interest would not be within the amplitude threshold. The amplitude threshold may also be based on a range of acceptable values. If the amplitude of interest is within the amplitude threshold, then the method 100 may continue to operation 126. In operation 126, the tester may declare that the drive performance is acceptable and pass the tape drive. If the amplitude of interest is not within the amplitude threshold, then the method 100 may continue to operation 124.

In operation 124, the tester may alert a user that the compensator needs to be adjusted. The compensator may be a tape drive component that balances the performance of the tape drive. The compensator may be manually or automatically adjusted based on the degree of the amplitude of interest. In various embodiments, the tester may fail the tape drive as a non-conforming tape drive.

Figure 2:
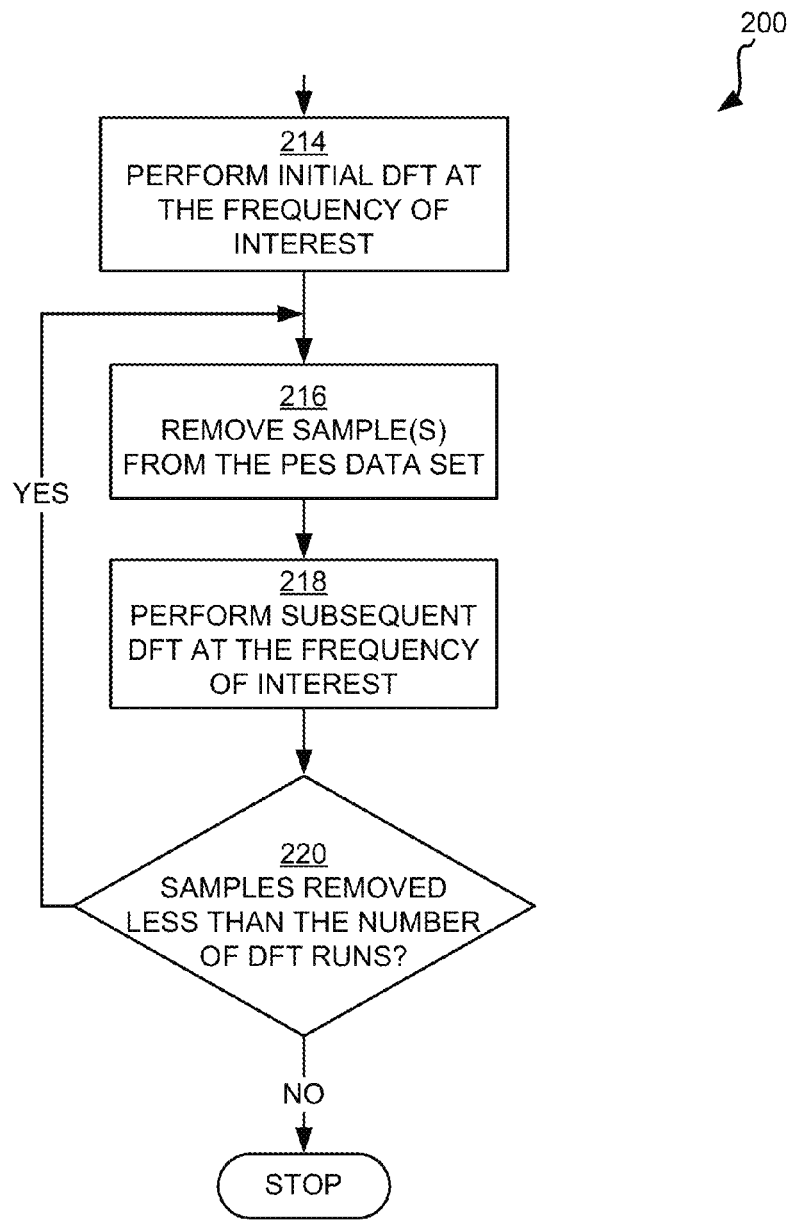
FIG. 2 illustrates a method of performing an iterative Discrete Fourier Transform (DFT) process on a position error signal (PES) data set, according various embodiments.

FIG. 2 illustrates a method 200 of performing iterative discrete Fourier transforms (DFTs) on PES data sets, according various embodiments. The method 200 may correspond to operation 116 from FIG. 1. The method 200 may begin at operation 214.

In operation 214, the tester may perform an initial DFT to the PES data set including the frequency of interest. In various embodiments, the PES data set may be initialized by performing the initial DFT. For instance, the entire PES data set may have an initial DFT performed and an amplitude for the frequency of interest recorded by the tester. The initial DFT may be applied to the entire PES data set. In various embodiments, a window may be established (discussed herein). The initial window may encompass all or a portion of the PES data set. Once the initial DFT is performed, then the method 200 may continue to operation 216.

In operation 216, the tester may remove or truncate a sample from a PES data set. The tester may remove a sample from either end, by one sample from the PES data set. In various embodiments, more than one sample may be removed from the PES data set. For example, if four samples are removed from the PES set, then the iteration will proceed faster than if one sample were removed but at the risk of not finding a precise (maximum) amplitude. Once a sample is removed from the PES data set, then the method 200 may continue to operation 218.

In operation 218, the tester may perform a subsequent DFT including the frequency of interest. The subsequent DFT may be the DFT operation after samples have been removed from the PES data set while the initial DFT may be performed with the PES data set without samples removed. After a subsequent DFT is performed on the PES data set with the sample removed, then the method 200 may continue to operation 220.

In operation 220, the tester may determine if the total number of samples removed from the PES data set is less than the determined number of the DFT iterations. In various embodiments, the number of DFT iterations may be determined mathematically using a similar process to operation 114 in FIG. 1.

The number of DFT iterations may be on the order of 100 samples removed. If the original PES data set collected has a significant number of samples, then there is little effect on the overall quality of the data. For example, if there are 100,000 samples in the PES data set, and only 100 samples are removed, then a small percentage of the PES samples being truncated would not result in a loss of frequency resolution, or general quality of the PES data set.

If the total number of samples removed is equal to or greater than the determined number of DFT iterations, then the method 200 may stop and the tester may locate the amplitudes, e.g., operation 118 in FIG. 1. For instance, if there are no more iterations to run, then the tester may initiate a stopping action on performing further iterations in response to the samples removed being equal to or greater than the determined number of DFT iterations. If the total number of samples is less than the number of DFT iterations, then the method 200 may continue to operation 216 where another iteration of removing the sample from the PES data set before performing a subsequent DFT is performed.

According to various embodiments, the samples may be notionally removed, i.e., removed from the DFT operation, and not deleted from the PES data set. In various embodiments, the tester may utilize a window to perform the DFT. For example, after each iteration, the window may be reduced by one sample and the DFT applied to the PES data set within the window. The window size may be reduced until the samples removed from the PES data set are equal to the determined number of DFT iterations, e.g., operation 114 in FIG. 1. In various embodiments, the window may shift in any direction, e.g., from a higher time value to a lower time value or vice versa. The window may also shift simultaneously, or alternatively after each iteration, from higher time values to lower time values on one end and lower time values to higher time values on another end. In various embodiments, the frequency of interest may be the DFT parameter. The window may be the sample size for a DFT at a particular frequency of interest.

Figure 3:
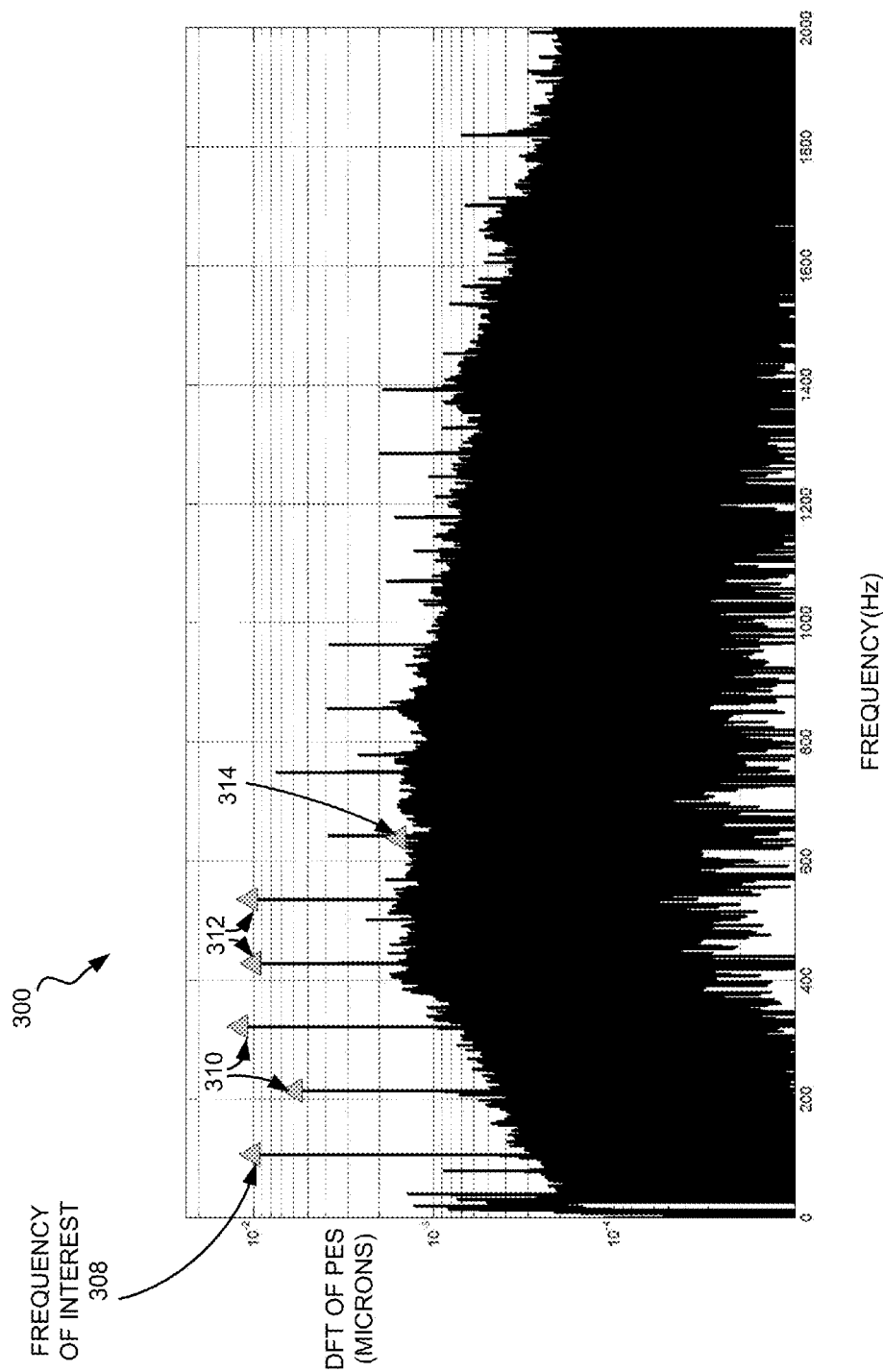
FIG. 3 illustrates a graph of a non-iterative Discrete Fourier Transform (DFT) applied to a PES data set, according to various embodiments.

FIG. 3 illustrates a graph 300 of a non-iterative Discrete Fourier Transform (DFT) applied to a PES data set, according to various embodiments. The graph 300 may illustrate the amplitudes that correspond to the frequency of interest and the corresponding harmonics. For example, the frequency of interest 308 may be determined to be 101 Hz. The second and third harmonics 310, fourth and fifth harmonics 312, and the sixth harmonic 314 are indicated on the graph 300.

The frequency of interest 308 may be predicted but the amplitude variation may not. At the frequency of interest 308, the amplitude of graph 300 may vary because of tape slippage. To find a more precise amplitude, aspects of the present disclosure may be used.

The size of the number of samples may be limited. For example, the PES data set may be sampled at a particular sampling rate. For example, 100,000 to 1 million samples may be obtained in 50 microseconds intervals at a 20 KHz sampling rate. When an FFT is applied to the PES dataset, the limit is the Nyquist frequency, which is half of the sampling rate, i.e., 10 KHz. After 10 KHz, the graph 300 has a mirroring effect, where the peaks are mirrored. In this example, the graph 300 may have an upper size limit of 10 KHz, even though only 2 KHz is shown.

Figure 4:
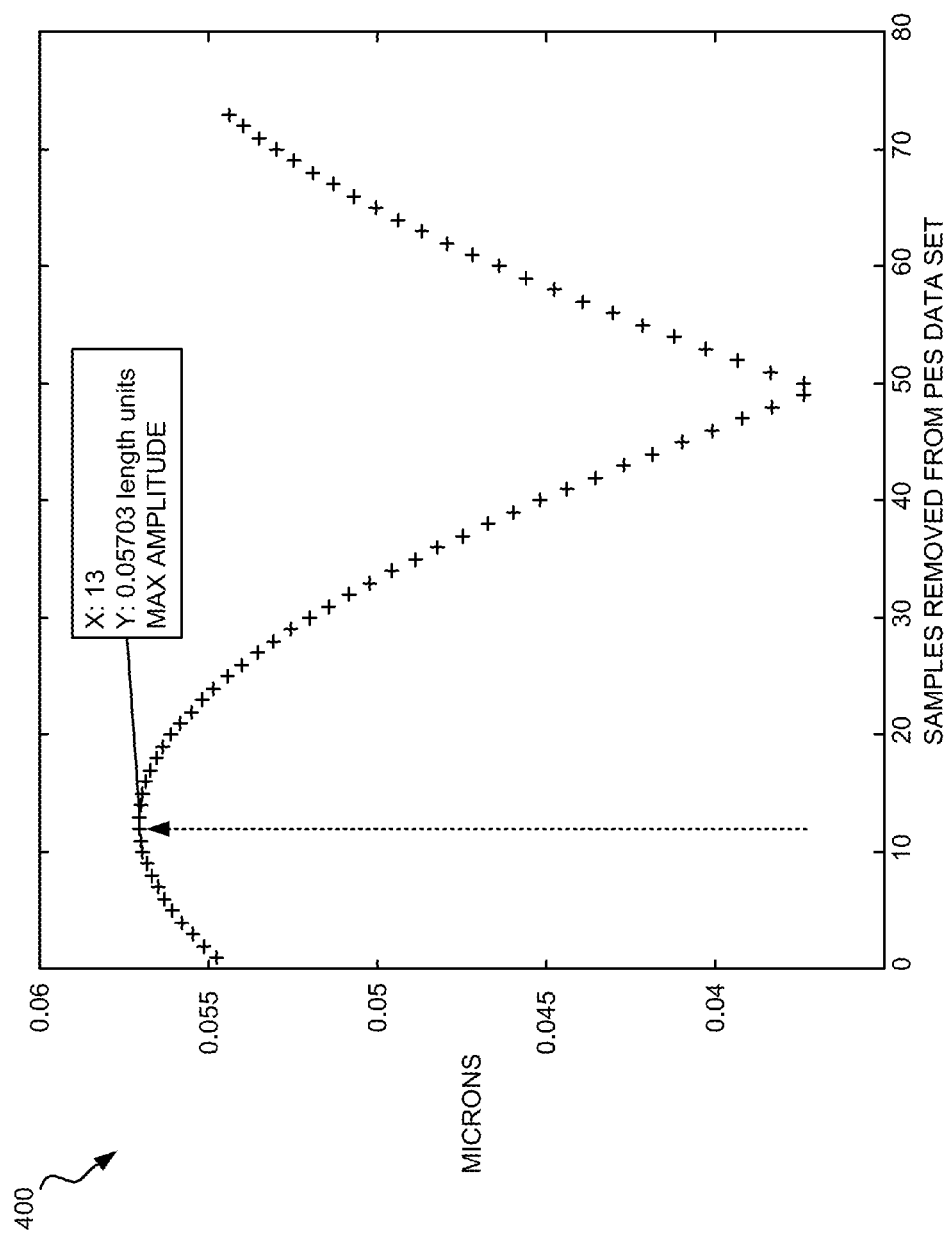
FIG. 4 illustrates a graph of an iterative DFT process applied a PES data set, according to various embodiments.

FIG. 4 illustrates a graph 400 of an iterative DFT process applied a PES data set, according to various embodiments. By monitoring the amplitude of the harmonic of interest, i.e., the result of the DFT iteration, for each iteration, the graph 400 may be formed. In the graph 400, the iterative DFT process was performed on a PES data set collected with each DFT having (N-iteration) samples removed.

In the graph 400, the amplitude of interest, e.g., a maximum amplitude, may be found after removing 13 points from the end of the collected PES data set of N-length, and the minimum is found when 50 points were removed from the data set of N-length. There may be a substantial difference in the amplitudes of the first harmonic. By finding the maximum amplitude, the tester may yield a result that has the least amount of leakage present for a multiple roller bearing tape path system.

If only a single DFT was processed on the PES data set, the amplitude of the frequency of interest would be unknown and random. Without correctly post-processing the data, there may be uncertainty in the amplitude for a given harmonic.

Figure 5:
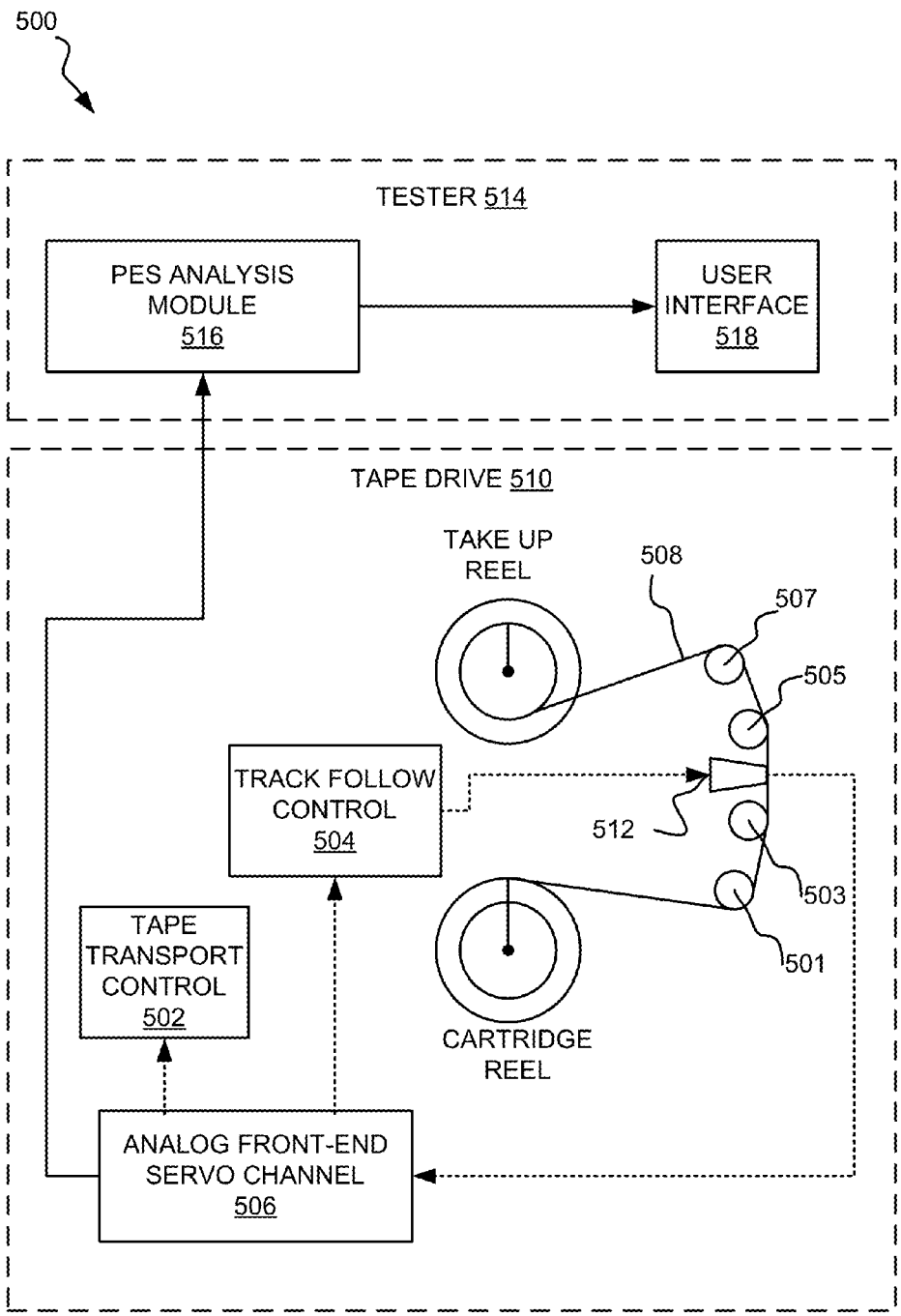
FIG. 5 illustrates a system used for performing the iterative DFT process, according to various embodiments.

FIG. 5 illustrates a system 500 used for performing the iterative DFT process, according to various embodiments.

The system 500 may include a tape drive 510. The tape drive 510 may read a storage tape 508 using a variety of components including a tape transport servo system and a track follow system. The storage tape 508 may be any magnetic-based storage. In a testing configuration, the storage tape 508 may use customer simulated data. The storage tape 508 may be configured to travel through one or more rollers on the tape drive 510.

The tape transport servo system may include the servo motors, the reels, e.g., take-up reel and cartridge reel, the rollers, e.g., 507, 505, 503, 501, and the tape transport control module 502 which may maintain a constant storage tape 508 velocity. The tape transport servo system controls the velocity of the storage tape 508 during read, write and seek operations as well as the tension applied to the tape through the rollers.

An increased data rate requirement may necessitate the use of higher tape transport velocities. At the same time, data rate matching also imposes the requirement of reliable operation at very low tape velocities. Furthermore, tight control of tension is necessary for supporting thinner tape, thereby enabling an increase in volumetric storage density, and mitigating lateral tape motion. The reduction in tape thickness renders the tape more fragile and hence more sensitive to tension variations.

The rollers 501, 503, 505, 507, may maintain the track of the storage tape 508 and provide the tension to produce a consistent storage tape 508 velocity. Each roller may be roughly identical to another roller, e.g., roller 501 may be 10 mm while roller 505 may be 10.01 mm. In various embodiments, the rollers may be of different sizes. As the storage tape 508 moves through the rollers, the microscopic differences between each roller may result in increased lateral movement. The lateral movement may be compensated by the track follow system.

The track follow system may include the track follow control 504 which may control the lateral/rotational position of the head tape interface 512 with respect to the storage tape 508. The basic function of the track-following control system 504 is to reduce the misalignment between the tape 508 and the recording head 512 created by lateral motion of the flexible medium. Lateral tape motion (LTM) arises primarily from imperfections in the tape guide rollers 501, 503, 505, 507, and reels, such as runouts, eccentricities and other tape path imperfections. In various embodiments, the track follow control 504 is the same as the compensator mentioned in operation 124 in FIG. 1.

One possible technique to enable higher track densities is the removal of the flanges from the rollers that are used to guide the tape through the tape path and across the read/write head 512. However, removal of the flanges may result in an increase in the amplitude of lateral tape excursions that in turn cause a substantial skew between the read/write head and the tape. To compensate for both LTM and the tape skew, flangeless tape drives may use a two-degree-of-freedom head positioning system that has both translational and rotational degrees of freedom.

Both the tape transport control 502 and the track follow control 504 may receive positional data of the head 512. The head/head-tape interface 512 may read the storage tape 508 and send data to the analog front-end servo channel 506. The analog front-end servo channel 506 may pass correction signals to both the tape transport control 502 and the track follow control 504. The analog front-end servo channel 506 of a tape drive system 510 is a signal processing unit that derives essential servo parameters, such as tape velocity, lateral head position, and longitudinal tape position from patterns that are written onto tape during manufacturing time.

The analog front-end servo channel 506 may determine the PES based on the positional data from the head 512. For instance, the position may be a sensed (actual) position on a tape that may be sensed by markers on the tape or by sensors on the take up reels, etc., and PES is the deviation from the expected position. The position may also be a position of the head 512 relative to the tape. For instance, servos (piezoelectric or similar) may be used to move the tape head 512 in a desired direction to adjust to the predicted positional variance of the tape. The lateral deviation from the predicted positional variance may be the PES. Aspects of the disclosure may relate to determining the amplitude of interest for a lateral positional movement of a storage tape 508 along roller bearings. Once the storage tape 508 is read by the tape drive 510, then the analog (or digital) signals may be sent to the tester 514.

The tester 514 may receive the signals from the tape drive 510 and perform the analysis to the PES data set as disclosed herein. The PES analysis module 516 may be used to perform iterations of DFTs for the PES data set. Once the analysis is completed, then the PES analysis module 516 may communicate the findings to the user interface 518. The user interface 518 may include one or more components that a user interacts with such as a graphical user interface or another program.

FIG. 6 illustrates a sample Position Error Signal graph 600, according to various embodiments. The graph 600 may illustrate a PES, which may be a positional variance from an expected value. The difference between the actual movement and the expected movement results in an error, which is provided as the PES. Similarly, rollers with imperfections may cause the tape to move from a perfect path by introducing small mechanical variances into the tape position. The mechanical variances could also show up in the PES.

The graph 600 may be based on a particular time. As time progresses, the PES may vary. The DFT iterations may be applied to the window 610. In various embodiments, the window 610 may start at time B. A DFT may be applied at a frequency range that includes the frequency of interest to obtain an amplitude value. After the DFT is determined for the window 610 at time B, then a certain number N samples may be removed from the window 610 before another iteration is performed. The number N samples may be at least one sample. For the next iteration, the DFT may be performed at time A and reduced by N samples until the number of DFT iterations is reached.

FIG. 7 illustrates a block diagram of automated computing machinery, according to various embodiments. According to various embodiments, the computing machinery may correspond to the tester 514 from FIG. 5. The computing machinery may include example computer 752 useful in performing aspects of the disclosure, according to various embodiments. The computer 752 of FIG. 7 includes at least one computer processor 756 or 'CPU' as well as random access memory 768 ('RAM') which is connected through bus adapter 758 to processor 756 and to other components of the computer 752.

The RAM 768 may include the PES analysis module 702. The PES analysis module 602 may determine the amplitude of interest 722 for a PES data set at a frequency of interest as discussed herein. The RAM 768 may include an operating system 754. Operating systems useful for record filtering according to embodiments of the present invention include UNIX®, Linux®, Microsoft XP™, AIX®, IBM's i5/OS™, and others. The operating system 754 are shown in RAM (768), but many components of such software typically are stored in non-volatile memory also, such as, for example, on a disk drive 770.

The computer 752 may also include disk drive adapter 772 coupled through expansion bus 760 and bus adapter 758 to processor 756 and other components of the computer 752.

Disk drive adapter 772 connects non-volatile data storage to the computer 752 in the form of disk drive 770. Disk drive adapters useful in computers include Integrated Drive Electronics ('IDE') adapters, Small Computer System Interface ('SCSI') adapters, and others. Non-volatile computer memory also may be implemented for as an optical disk drive, electrically erasable programmable read-only memory (so-called 'EEPROM' or 'Flash' memory), RAM drives, and so on.

The data storage 770 may include one or more storage devices. The data storage 770 may be configured to have one or more amplitudes of interest 722 stored The example computer 752 includes one or more input/output ('I/O') adapters 778. I/O adapters implement user-oriented input/output through, for example, software drivers and computer hardware for controlling output to display devices such as computer display screens, as well as user input from user input devices 781 such as keyboards and mice. The I/O adapters 778 may also communicate with the head tape interface 736 which may send an analog signal to the computer 752 for processing by the PES analysis module 702. The example computer 752 includes a video adapter 709, which is an example of an I/O adapter specially designed for graphic output to a display device 780 such as a display screen or computer monitor. Video adapter 709 is connected to processor 756 through a high speed video bus 764, bus adapter 758, and the front side bus 762, which is also a high speed bus.

The example computer 752 includes a communications adapter 767 for data communications with other computers 710, e.g., mobile devices, and for data communications with a data communications network 700. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters include modems for wired dial-up communications, Ethernet (IEEE 802.3) adapters for wired data communications network communications, and IEEE 802.77 adapters for wireless data communications network communications.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Referring to FIG. 7, the present invention may be a system, a method, and/or a computer program product. The computer program product may include a computer readable storage medium (or media) having computer readable program instructions thereon for causing a processor to carry out aspects of the present invention.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

What is claimed is:

1. A method comprising:
   receiving, from a tape drive, a Position Error Signal (PES) data set, that describes a positional variance of a head tape interface in relation to a tape and that has a number of samples;
   determining a frequency of interest based on a size of one or more rollers in the tape drive and a velocity of the tape;
   determining a number of Discrete Fourier Transform (DFT) iterations based upon the frequency of interest and the number of samples;
   performing, based upon the determined number of DFT iterations, a plurality of DFT iterations on the PES data set including the frequency of interest, each DFT iteration performed on a different number of samples from the PES data set; and
   identifying a plurality of amplitudes from the plurality of DFT iterations that corresponds to disturbance from one of the rollers in the tape drive.

2. The method of claim 1, further comprising:
determining the amplitude of interest from the plurality of amplitudes from the plurality of DFT iterations.

3. The method of claim 2, further comprising:
comparing the amplitude of interest to an amplitude threshold; and
accepting the tape drive in response to the amplitude of interest being within the amplitude threshold.

4. The method of claim 3, further comprising:
rejecting the tape drive in response to the amplitude of interest being outside the amplitude threshold.

5. The method of claim 2, wherein determining the amplitude of interest includes
determining a maximum amplitude value for the plurality of amplitudes.

6. The method of claim 1, wherein determining the frequency of interest includes
determining a harmonic of the frequency of interest.

7. The method of claim 1, wherein determining the frequency of interest includes:
receiving a frequency tolerance range; and
selecting one or more frequencies within the frequency tolerance range for the frequency of interest.

8. The method of claim 1, wherein the performing a plurality of DFT iterations on the PES data set includes:
initializing a window that has a window size corresponding to a number of samples from the PES data set;
performing an initial DFT iteration on the window of samples from the PES data set;
changing the window size by at least one sample;
performing a subsequent DFT iteration on the changed window; and
stopping the plurality of DFT iterations in response to a number of DFT iterations performed being at least equal to the determined number of DFT iterations.

9. The method of claim 8, wherein the changing the window size includes:
reducing the window from a higher time value to a lower time value.

10. The method of claim 9, further comprising:
reducing the window from a lower time value to a higher time value.

11. A tape drive testing system comprising:
a tape drive that is configured to read a position error signal (PES) from a storage tape that describes a positional variance of a head tape interface in relation to the storage tape; and
a position error signal (PES) analysis module that is configured to:
receive, from the tape drive, a PES data set that has a number of samples,
determine a frequency of interest based on a size of one or more rollers in the tape drive and a velocity of the storage tape,
determine a number of Discrete Fourier Transform (DFT) iterations based upon the frequency of interest and the number of samples,
perform, based upon the determined number of DFT iterations, a plurality of DFT iterations on the PES data set including the frequency of interest, each DFT iteration performed on a different number of samples from the PES data set, and
identify a plurality of amplitudes from the plurality of DFT iterations that corresponds to noise from one of the rollers in the tape drive.

12. The system of claim 11, wherein the PES analysis module is configured to:
determine the amplitude of interest from the plurality of amplitudes from the plurality of DFT iterations.

13. The system of claim 12, wherein the PES analysis module is configured to:
compare the amplitude of interest to an amplitude threshold;
accept the tape drive in response to the amplitude of interest being within the amplitude threshold;
reject the tape drive in response to the amplitude of interest being outside the amplitude threshold.

14. The system of claim 11, wherein the PES analysis module is configured to determine the frequency of interest by determining a harmonic of the frequency of interest.

15. The system of claim 11, wherein the PES analysis module is configured to determine the frequency of interest by:
receiving a frequency tolerance range; and
selecting one or more frequencies within the frequency tolerance range for the frequency of interest.

16. The system of claim 11, wherein the PES analysis module is configured to perform a plurality of DFT iterations on the PES data set by:
initializing a window that has a window size corresponding to a number of samples from the PES data set;
performing an initial DFT iteration on the window of samples from the PES data set;
changing the window size by at least one sample;
performing a subsequent DFT iteration on the changed window; and
stopping the plurality of DFT iterations in response to a number of DFT iterations performed being at least equal to the determined number of DFT iterations.

17. The system of claim 16, wherein the changing the window size includes: reducing the window from a higher time value to a lower time value.

18. A computer program product for testing a tape drive, the computer program product comprising a computer readable storage medium having program instructions embodied therewith, wherein the computer readable storage medium is not a transitory signal per se, the program instructions readable by a computer to cause the computer to perform a method comprising:
receiving, from the tape drive, a Position Error Signal (PES) data set, that describes a positional variance of a head tape interface in relation to a tape and that has a number of samples;
determining a frequency of interest based on a size of one or more rollers in the tape drive and a velocity of the tape;
determining a number of Discrete Fourier Transform (DFT) iterations based upon the frequency of interest and the number of samples;
performing, based upon the determined number of DFT iterations, a plurality of DFT iterations on the PES data set including the frequency of interest, each DFT iteration performed on a different number of samples from the PES data set; and
identifying a plurality of amplitudes from the plurality of DFT iterations that corresponds to noise from one of the rollers in the tape drive.

19. The computer program product of claim 18, wherein the program instructions readable by the computer cause the computer to perform a method further comprising:
determining the amplitude of interest from the plurality of amplitudes from the plurality of DFT iterations.

20. The computer program product of claim 19, wherein the program instructions readable by the computer cause the computer to perform a method further comprising:
- comparing the amplitude of interest to an amplitude threshold; and
- accepting the tape drive in response to the amplitude of interest being within the amplitude threshold.

* * * * *